UNITED STATES PATENT OFFICE.

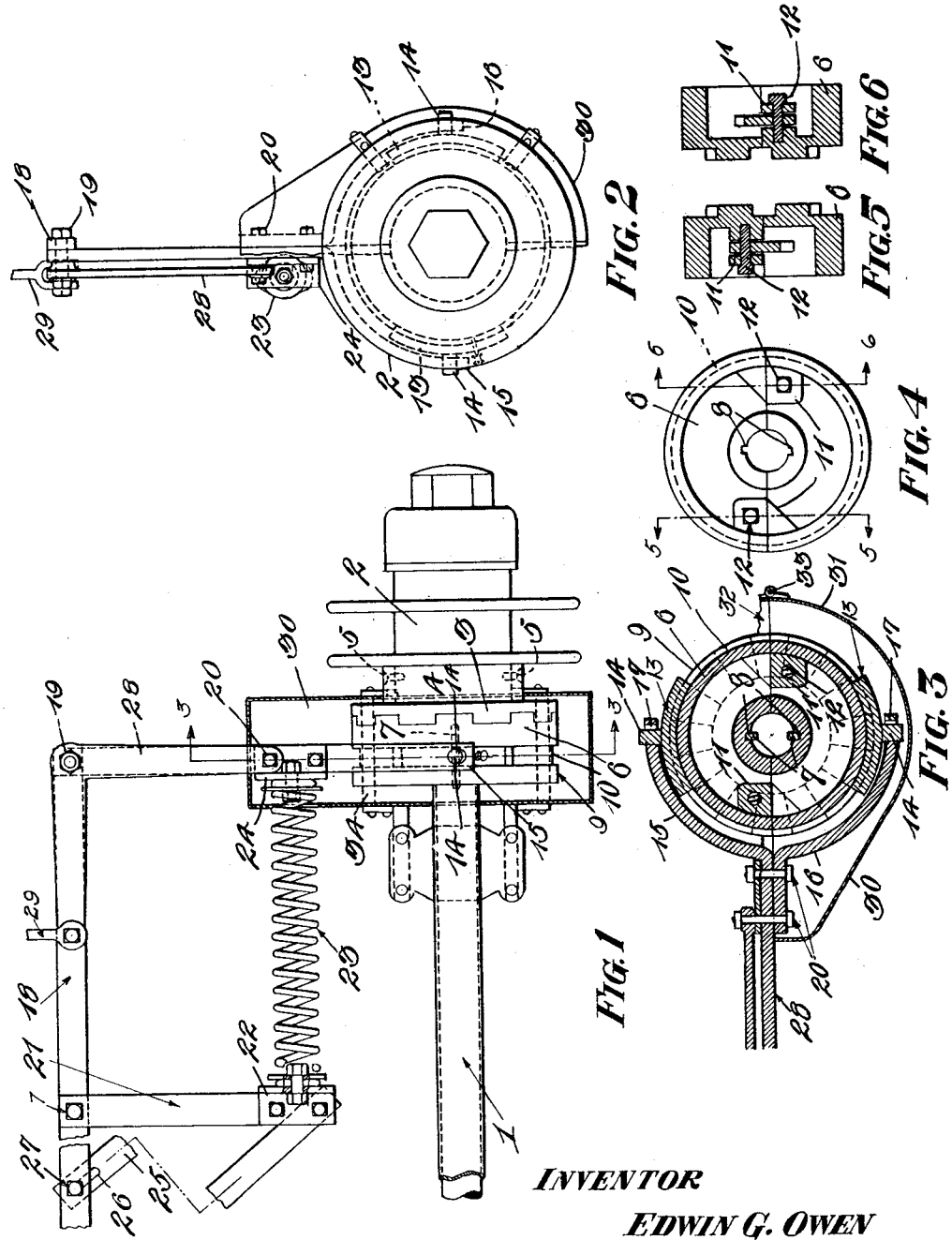

EDWIN G. OWEN, OF WYSOX, PENNSYLVANIA.

FREE-RUNNING WHEEL.

1,032,079.  Specification of Letters Patent.  Patented July 9, 1912.

Application filed November 11, 1911. Serial No. 659,774.

*To all whom it may concern:*

Be it known that I, EDWIN G. OWEN, a citizen of the United States, residing at Wysox, in the county of Bradford and State of Pennsylvania, have invented certain new and useful Improvements in Free-Running Wheels, of which the following is a specification, reference being had to the accompanying drawings.

This invention relates to free running wheels for a traction and rigid axle, with a clutch for the free running wheels on a traction axle, and has for its object to provide a clutch so devised as to release one wheel on a traction axle, converting it into a free running wheel, thus reducing friction and saving power and wear in rounding curves.

Another object of this invention is to provide a device of this character which will be silent in running and there will be no shock or jar when the clutch is released or when it is placed in engagement with the clutch on the hub, as both wheels are in motion.

Another object of this invention is to provide a device of this character which will possess advantages in points of efficiency and durability, is inexpensive of manufacture and at the same time is simple in construction and operation.

With the above and other objects in view the invention consists in the novel features of construction and the combination and arrangement of parts hereinafter described, pointed out in the claims and shown in the accompanying drawings, in which, Figure 1 is a top plan view showing the clutch applied to one of the wheels of the traction axle, the hood being in section. Fig. 2 is an end elevation. Fig. 3 is a sectional view on the line 3—3 of Fig. 1. Fig. 4 is a face view of one of the clutch members. Fig. 5 is a sectional view on the line 5—5 of Fig. 4. Fig. 6 is a sectional view on the line 6—6 of Fig. 4.

Referring more particularly to the drawings, 1 indicates the traction axle of a vehicle having a hub 2 rotatably mounted on the outer end thereof. Mounted on the inner end of the hub is one of the clutch members 3, said member having a collar 4 formed integral therewith so that it can be easily secured to the hub by means of the counter sunk screws 5. The second clutch member 6 is keyed to the axle for sliding movement by means of the keys 7 fitting into the seats 8. This second clutch member can be made in one piece or two to suit the manufacturer or user. The one piece member would be made similar to the two piece member excepting the projecting rim 9 which is provided with an annular groove 10. If it is desired to make the second clutch member in two pieces, they should be divided so that the key seats 8 on each half would be in the center to correspond to the keys 7 on the axle. These two halves are held together by means of the ears 11 formed beneath the projecting rim 9, one half of the member 6 having two ears on one side and one in the other, and the other half having the ears placed just the reverse so that the single ears on one half fit into the double ears of the other half and are held securely together by means of the tap bolts 12.

Mounted in the groove 10 are the castings 13, each of said castings being provided with a stud 14 formed integral therewith at its middle point. These castings are held in place by two arms 15 and 16 enlarged at one end and provided with an opening 17 to fit over the studs 14. The arm 15 bends around the clutch and is then bent so as to be disposed in a horizontal plane and extending forward to meet the cross bar 18 which lies parallel with the axle, the arm 15 and bar 18 having their ends secured by means of the bolt 19. The arm 16 bends around the clutch and its outer end is bent in a horizontal plane and arranged parallel with the arm 15 to which it is secured by means of the bolts 20.

A rearward extending bar 21 is pivotally connected to the cross bar 18 and disposed at right angles thereto. Secured to the lower end of this bar 21 is an angle iron 22 having one end of a heavy coil spring 23 secured thereto, said coil spring having its other end bolted to the rear end of the bar 21.

A brace bar 25 is provided, having a slot 26 formed in one end thereof and adjustably secured to the bar 18 by means of the bolt 27, said bar extending rearwardly at an angle and having its other end bolted to the rear end of the bar 21. The bar 25 may be easily adjusted by sliding the same upon the bolt 27, and by having the bar 25 connected to the lower end of the bar 21, the tension of the spring 23 may be easily adjusted.

Pivotally mounted on the bolt 19 is a bell crank lever 28 having one end bolted to the angle iron 24 and the arms 15 and 16 by means of the bolts 20, secured to the other end of said lever is the operating rod 29, said rod having its other end connected up to any desired operating means.

A housing 30 is provided for the clutch members, said housing comprising the two sections 31 and 32 hinged together at 33, and are supported by means of the rods 34 which are riveted to one half of the housing and having their ends secured to the under side of the main body spring of the vehicle. One side of the housing is provided with two openings for the springs 23 and the axle 1 to pass through. This housing is provided to keep the dust and mud from the clutch members. The purpose of the spring 23 is to hold the clutch members normally in engagement, except when released by the operating rod 29.

When the parts are assembled, the operation of the same is as follows: By the forward movement of the rod 29 the bell crank lever 28 is turned so that its rear end compresses the spring 23 and at the same time slides the clutch member 6 inwardly upon the axle so as to release the same from the member 3 and allow the wheel to run free, and upon releasing the rod 29 the spring 23 will slide the member 6 outwardly to engage with the member 3.

It is a known fact that wheels of the same diameter when rounding a corner or curve, one wheel will revolve more rapidly than the other and if these wheels are rigid on the axle, one wheel must at times slide instead of rolling, thus causing a good deal of friction and wear on the sliding wheel.

The object of my invention is to provide a device whereby one wheel on the traction axle will be released when rounding a curve or turning a corner so as to allow it to run free upon the axle thereby relieving all friction and wear, it being understood that the other driving wheel will be sufficient to run the vehicle around the corner or curve. It is frequently necessary to turn the car entirely around making a full circle of 360°, and whether the turn is made to the right or left, one of the traction wheels can be released and allowed to run freely on the axle and there is no sliding or skidding. This device is especially valuable on heavy traction vehicles in towns and cities where there are so many turns to make.

It will be understood that my improved clutch device is for use on the right hand traction wheel only, while the left hand wheel is rigidly secured to the axle, thus when a car is rounding a curve to the left the clutch is released allowing the right wheel to run free upon the axle, it being understood that the outer wheel revolves more rapidly than the inner. When rounding a curve to the right, the left hand or rigid wheel will revolve more rapidly and the clutch device will be released allowing the axle to turn with the outside wheel while the inner or right hand wheel will be free and will revolve much slower, thus it will be seen that if the inner wheel was also rigid on the axle, it would at times be sliding or skidding along causing a good deal of wear on this sliding wheel.

While I have shown and described the preferred form of my invention it will be obvious that various changes in the details of construction and in the proportions may be resorted to for successfully carrying my invention into practice, without sacrificing any of the novel features or departing from the scope thereof.

Having thus described this invention, what is claimed is:—

1. The combination with a traction axle having a wheel loosely mounted thereon of clutch connections between said axle and wheel, arms carried by said clutch and secured together at one side of said clutch, one of said arms being bent to a horizontal plane and extending forwardly, a cross bar connected to the outer end of said arm, a rearwardly extending bar secured to said cross bar and disposed at right angles thereto, an angle iron mounted on the rear end of said rearwardly extending bar, an angle iron secured to the horizontal portion of said forwardly extending arm, a coil spring mounted between said angle irons, to hold said clutch in effective position, means for adjusting the tension of said spring and means for compressing said spring to disengage the clutch allowing said wheel to run free upon the axle.

2. The combination with a traction axle having a wheel loosely mounted thereon of clutch connections between said axle and wheel, converging arms carried by said clutch and secured together at one side thereof, one of said arms extending forwardly in a horizontal plane, a cross bar secured to the outer end of said arm, a rearwardly extending bar secured to said cross bar and disposed at right angles thereto, a coil spring having one end secured to the rear end of said second bar and the other end mounted on said arms to hold said clutch in effective position, a brace rod having one end secured to the rear end of said second bar and the other end adjustably mounted on said cross bar for adjusting the tension of said spring, and means for disengaging said clutch allowing said wheel to run free upon the axle.

3. The combination with a traction axle having a wheel loosely mounted thereon of clutch connection between said axle and wheel, converging arms carried by said clutch, one of said arms extending forwardly in a horizontal plane, a cross bar secured to the outer end of said arm, a rearwardly extending bar secured to said cross bar, an angle iron mounted on the rear end of the second bar, a second angle iron mounted on said arms, a coil spring disposed between said irons and having each end secured to hold said clutch in effective position, a brace rod having one end secured to the rear end of said second bar and the other end adjustably mounted on said cross bar, a bell crank lever pivotally mounted on the end of the cross bar and the forwardly extending arm, said lever having one end secured to the arms carried by the clutch and an operating rod connected to the other end of said lever to disengage the clutch allowing said wheel to run free upon the axle.

In testimony whereof I hereunto affix my signature in the presence of two witnesses.

EDWIN G. OWEN.

Witnesses:
SUSAN A. OWEN,
HILA NOBLES WILLIAMS.

Copies of this patent may be obtained for five cents each, by addressing the "Commissioner of Patents, Washington, D. C."